TWO-SPEED PHONOGRAPH DRIVE

Filed April 26, 1965 3 Sheets-Sheet 1

INVENTORS
Fred H. Osborne
Robert S. Tuttle
By: Olson, Trexler, Wolters & Bushnell Attys.

TWO-SPEED PHONOGRAPH DRIVE

Filed April 26, 1965

3 Sheets-Sheet 2

INVENTORS:
Fred H. Osborne
Robert S. Tuttle
By: Olson, Trexler
Wolters & Bushnell attys.

TWO-SPEED PHONOGRAPH DRIVE

Filed April 26, 1965 3 Sheets-Sheet 3

Inventors
Fred H. Osborne
Robert S. Tuttle
By: Olson, Trexler, Wolters & Bushnell Attys.

United States Patent Office 3,393,915

Patented July 23, 1968

3,393,915

TWO-SPEED PHONOGRAPH DRIVE

Fred H. Osborne, Williamsville, and Robert S. Tuttle, Eggertsville, N.Y., assignors to The Wurlitzer Company, Chicago, Ill., a corporation of Ohio Filed Apr. 26, 1965, Ser. No. 450,680
9 Claims. (Cl. 274—9)

ABSTRACT OF THE DISCLOSURE

An automatic phonograph having an idler wheel and pulley unit which is electromagnetically retracted from a stepped drive-shaft spindle and electromagnetically shifted axially of the spindle, and a plurality of O-rings driving the turntable from the idler pulley.

This invention relates to the art of reproducing phonograph records, and more particularly to an automatic speed changing device for playing records designed to be reproduced at different speeds of rotation.

Coin operated phonographs, commonly referred to as "juke boxes," for some years have been designed to reproduce or play primarily records designed for rotation at 45 r.p.m. These records are seven inches in diameter and they have a relatively large center hole. More recently, small 33⅓ r.p.m. records, commonly referred to as "Little LP's" have come into use. These are of the same seven inch diameter, but have relatively very small center holes. It is often desired to place such records in a juke box for reproduction alternatively with the 45 r.p.m. records. It is known that the difference in size of the center holes can be used to control the drive speed, and for example Osborne 2,673,089 and 2,851,273 show apparatus for detecting the size of the center hole to determine the drive speed.

The primary object of the present invention is to provide an improved and automatically operable two speed drive for a coin operated phonograph.

It is an additional object of this invention to provide a change-speed device in a coin operated phonograph which is rugged and positive in operation.

Yet another object of the present invention is to provide a change-speed device in a coin operated phonograph in which certain of the driving parts are positively disengaged during speed changing in at least one direction, whereby to avoid undue wear on the parts, or possible malfunction of the mechanism.

It is yet another object of the present invention to provide a change-speed device in a coin operated phonograph in which the parts are spring urged to a position for driving at one speed and are solenoid operated in the other direction, including means for positively insuring operation and latching of the solenoid in desired position.

Still another object of the present invention is to provide a change-speed device in a coin operated phonograph utilizing particularly inexpensive drive belts.

Other and further objects and advantages of the present invention will be apparent from the following description when taken in connection with accompanying drawings wherein:

FIG. 1 is a view of the upper rear portion of a phonograph constructed in accordance with the principles of the present invention, the casing of the phonograph being removed for illustartive purposes;

FIG. 1*a* is a detail horizontal view taken along the line 1*a*—1*a* in FIG. 1;

FIG. 2 is a fragmentary horizontal view partly in section as taken substantially along the line 2—2 in FIG. 1;

FIG. 2*a* is a horizontal section providing further illustration of part of the mechanism in FIG. 2 and taken substantially along the line 2*a*—2*a* in FIG. 1;

The basic phonograph of which parts are shown herein is the Wurlitzer model 1700 phonograph. Reference may be made to the commercial phonograph or to the U.S. patent thereon, namely Fred H. Osborne et al. U.S. Patent 3,165,321 for "Automatic Phonograph." Reference is made herein to such parts of the phonograph as are necessary to understand the invention, but other parts are left out to avoid prolixity of description, and reference may be made to the patent or to the commercial phonograph, as noted above.

Figures 1, 1A:
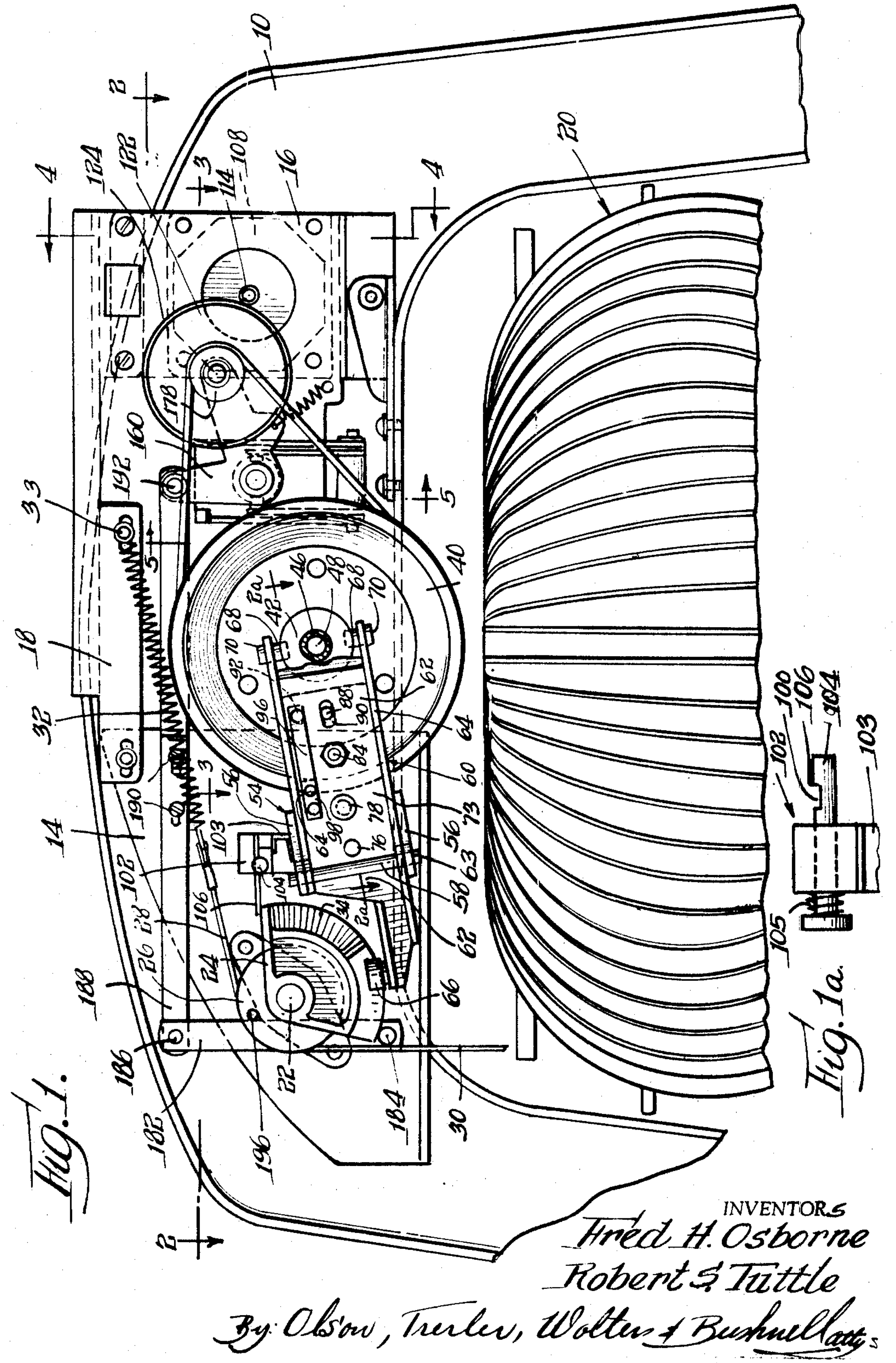
Figures 2, 2A, 3:
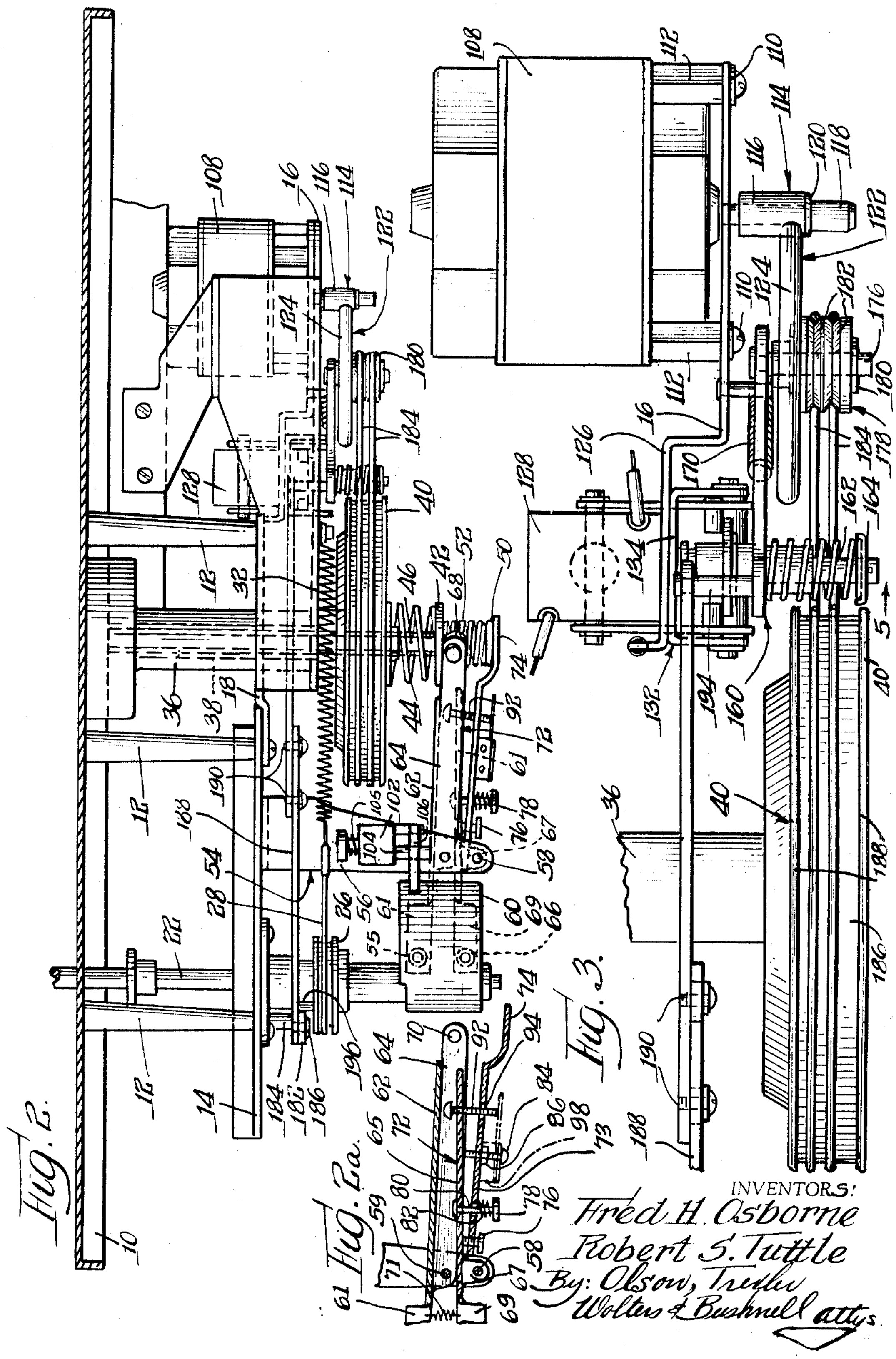
FIG. 3 is a horizontal sectional view taken along the line 3—3 in FIG. 1.

Referring now in greater particularity to the drawings, and first of FIGS. 1 and 2, there is shown a supporting frame 10 constructed of suitable material such as die cast or sheet metal or the like, and having various spacers 12 thereon supporting a rear base plate 14 and a motor plate 16 connected by an intermediate plate 18. A carousel or donut-shaped record magazine 20 is supported from the frame 10 for rotation about a vertical axis. The details of the magazine and the selector therefore are not important to the present disclosure.

A tone arm shaft 22 is supported by the frame 10 and plate 14 for pivoting therein, and has a cam 24 secured on the rear end thereof. A pulley 26 is secured to the tone arm shaft 22 forwardly of the cam and a wire or cable 28 passes over this pulley. The wire is wrapped around the pulley so that it is in contact therewith over more than 360 degrees, whereby to insure rotation of the pulley with the wire. The bottom or lower portion of the wire extends substantially straight down at 30 and is moved down at the proper times under control of the main cam of the machine, the structure of which need not be gone into at the present time. The opposite end of the wire 28 is secured to a tension spring 32 having the opposite end thereof anchored as to a stud 33 on the intermediate plate 18. Thus, the main cam acts to turn the pulley counter-clockwise as viewed in FIG. 1, while the spring 32 subsequently returns the pulley in a clockwise direction. The cam comprises a segment of somewhat over 90 degrees and has a rear face cam 34 and an oppositely disposed front cam face thereon. As will be understood, the pulley 26 is actuated through the wire 28, 30 to move the tone arm into position to start playing a record, and subsequently to return the tone arm to a rest position when the playing of a record has been completed.

A hollow boss 36 extends rearwardly from the frame 10 and journals the drive mechanism for the phonograph, comprising the shaft identified generally by the numeral 38. The shaft has a pulley 40 secured thereon, and this pulley will be discussed more fully hereinafter. A washer or flange 42 is secured to the shaft 38 and is urged away from the pulley by a helical spring 44 compressed between the flange and the pulley. Specifically, the part of the shaft 38 on which the washer 42 is fixed comprises a hollow sleeve or tube 46. The pulley 40 is fixed on a larger outside portion of the shaft 38, and the opposite end of this shaft 38 is fixed to a turntable (not shown) in a vertical plane, i.e. rotatable about a horizontal axis. The tube or sleeve 46 is axially movable in a forward direction (up in FIG. 2) and is connected to mechanism for centering a record on the turntable. A center spindle 48 extends rearwardly beyond the end of the tube 46 and has a spring retainer 50 secured to the outer end thereof, a helical spring 52 being compressed between the washer 42 and the spring retainer 50. The spindle 48 may move forward with the tube 46 and also relative thereto, thereby to operate mechanism to clamp the record in playing position in front of the turntable and to detect whether the centering mechanism associated with the turntable enters the large hole of a 45 r.p.m. record or does not enter the smaller hole of a 33⅓ r.p.m. record.

As exemplary of the type of construction suitable for use in the record detecting and clamping mechanism, reference is made to Hull et al. U.S. Patent 2,891,797 for the showing of a clamping mechanism of generally the type in question, and reference also is made to Osborne U.S. Patents 2,673,089 and 2,851,273 for typical art on speed selection by detection of the size of the record center hole. The important thing for the present invention is that the spindle 48 comes to rest with the spring support 50 spaced farther from the washer 42 for a 33⅓ r.p.m. record than it does for a 45 r.p.m. record.

A bracket 54 is mounted on and extends rearwardly from the plate 14 and comprises a pair of like, generally vertically spaced substantially horizontal ears 56. This bracket is disposed between the cam 24 and the pulley 40 and has two pivot pins 58, and 59 extending between the ears and tilted slightly from the vertical. A turntable shaft control arm 60 is pivoted on the pin 59 and is of somewhat channel shape, comprising a web 62 and a pair of side flanges 64. The web at the left end (as viewed in FIGS. 1 and 2*a* has a lower flange 61 on which is an upstanding stud carrying a cam follower roller 55 FIG. 2) cooperating with the front face cam. At the opposite end the web 62 is terminated short of the ends of the flanges 64 and rollers 68 are carried on the inner faces of these flanges on suitable studs 70 with the rollers in engagement with the washer 42. Thus, the cam 34 is effective through the arm 60 to move the washer in (upwards in FIG. 2) against the spring 44.

An auxiliary arm 72 is carried from the arm 60 and is perhaps best seen in FIG. 2*a*, taken along with FIGS. 1 and 2. The auxiliary arm comprises a generally flat plate 65 having a pair of ears 67 pivoted on the stud 58. The portion of the auxiliary arm 72 to the left of the ears 67 has a lower substantially horizontal flange 69 having thereon a cam follower roller 66 engaging the rear face cam 34. A spring 71 stretched between the flanges 61 and 69 holds the rollers 65 and 66 against the respective face cams. The plate 65 terminates at the right end approximately at the end of the web 62.

An operator plate 73 is pivotally mounted on the arm plate 65 and has an offset, partially curved end portion 74 abutting the spring base 50. The plate 73 is apertured adjacent the opposite (left) end and a headed stud 76 extends loosely through the aperture and is fixed in the plate 65 of the arm 72. The stud 76 serves as a pivot for the operator plate 73 toward and away from the plate 65. A longer stud 78 having a relatively large head thereon is fixed on the plate 65 to the right of the stud 76 and also projects through an enlarged opening 80 therein. A helical spring 82 is compressed between the head of the stud 78 and the plate 73 to urge the plate 73 toward the arm plate 65. The position of the plates as urged toward one another is limited by a screw 84 threaded through the plate 73 and abutting the plate 65. A lock nut 86 secures the screw 84 in adjusted position.

A pin 88 (FIG. 1) is fixed in the plate 65 and extends rearwardly therefrom through an aperture 90 elongated longitudinally of the plate 73 and serves as a guide to keep the plate 73 from moving up or down relative to the arm 60. Above the pin 88 and blocking it from view in FIG. 2*a* there is an insulated screw 92, preferably made of plastic material, threaded through the plate 65 and passing through an enlarged aperture 94 in the plate 73. The end of the screw abuts a relatively long switch arm 96 of a switch 98.

A relay 102 (FIGS. 1, 1*a* and 2) is mounted on a bracket 103 on the upper ear 56 of the bracket 54. This relay is electrically interconnected with the switch 98 and is operated thereby upon operation of the switch. When the relay 102 is energized, a plunger 104 projects from the side thereof beneath a flexible blade 106 carried from the side of the relay 102. The projecting member 104 has a notch 100 therein which receives the blade 106 to hold the plunger out against a biasing spring 105. With the parts in rest position the blade is held up by the cam 24. However, when the shaft 22 and cam have pivoted in a clockwise direction the blade, being inherently biased flexibly down, rides on top of the plunger, and is received in the notch 100 in the top of the plunger 104 to hold this plunger out. When the cam rocks back to its counterclockwise limited position it raises the blade 106, whereby the plunger 104 is free for spring retraction within the relay if the relay is deenergized.

A constant speed electric induction motor 108 (see particularly FIGS. 3 and 4, but also FIGS. 1 and 2) is mounted on the front of the motor mounting plate 16 by a suitable means such as bolts 110 and spacers 112, generally in accordance with conventional practice. The motor shaft extends rearwardly through a suitable aperture in the plate 16 and is provided at its outer end with a stepped drive spindle 114 having a relatively large diameter cylindrical portion 116 relatively adjacent to motor, and a relatively smaller cylindrical portion 118 disposed relatively remote to the motor. A tapered or beveled shoulder 120 is positioned between the cylindrical portions 116 and 118. An idler wheel 122 has a rubber tire 124 thereon bearing against the spindle 114 to drive the wheel. The speed at which the wheel is driven depends on which of the cylindrical portions 116 and 118 is engaged by the wheel. The mechanism for effecting engagement with one or the other of these two cylindrical portions will now be described.

A plate 126 is offset forwardly from the motor mounting plate 16 and has a solenoid 128 (FIGS. 3 and 5) mounted on the front thereof. The solenoid has a plunger 130 extending downward therefrom and movable up upon energization of the solenoid.

A bracket 132 (see also FIG. 6) is mounted on the front of the plate 126 and comprises a web 134 bolted or otherwise suitably secured to the plate, and a pair of vertical forwardly extending flanges 136 in spaced parallel relation. The flanges 136 at the lower ends are provided with downwardly extending ears 138 between which extends a pivot shaft 140. A bell crank 142 is pivoted on the shaft 140, and comprises a pair of forwardly extending horizontal arms 144 pivoted on a cross pin or shaft 146 to the bottom end of the solenoid plunger 130. The bell crank 142 also includes a central sleeve or cylindrical portion 148 pivoted on the pivot shaft 140, and upstanding substantially vertical side arms 150, having inwardly projecting lugs or rollers 152 at the upper ends thereof.

A stud 154 is secured to the web 134 of the bracket 132 and extends rearwardly therefrom perpendicular to the web. A shiftable sleeve or collar 156 is provided on the stud, and a flange or washer 158 on the sleeve bears against the studs or rollers 152. A bell crank 160 is fixed on the sleeve 156 for pivoting about the axis of the stud 154. This bell crank and the sleeve are urged forwardly of the machine, i.e. toward the web 134, by a coil spring 162 encircling the outer end of the sleeve and the stud and bearing against the rear face of the bell crank 160, the spring being held under compression by a spring anchor 164 suitably secured on the outer or rear end of the stud.

The bell crank 160 comprises a generally upstanding arm 166 and a lateral arm 168 extending to the right and somewhat upwardly from the pivot stud 154. A spring 170 is stretched between an aperture in an ear 172 on this arm and a fixed pin 174 on the motor mounting plate 16. A rearwardly projecting stud 176 is fixed on the outer end of the arm 168 and rotatably mounts the wheel 122.

A double-grooved pulley 178 is fixed to or formed as a unit with the wheel 122, the wheel 122 and pulley being journaled for rotation on the stud 176. A snap ring or a split washer 180 holds the pulley and wheel on the stud. Each of the two grooves of the pulley 178, hereinafter identified by the numeral 182 comprises a V groove, and is of proper axial dimension to receive an elongated O-ring 184 of rubber or the like. The O-rings 184 extend over the groove or land 186 of the large pulley 40, there being radially extending circumferential flanges 188 on opposite axial ends of the groove or land 186. The groove or land has a cylindrical surface, and as will be apparent, the O-rings 184 serve as a drive belt to drive the pulley 40 from the pulley 178.

The O-rings 184 form a simple and inexpensive drive belt. The two rings are superior to one larger ring since the deformation of the cross section of each ring as it passes over a pulley is much less significant in the O-rings of small cross sectional area than it would be in an O-ring of larger cross sectional area.

Figures 4, 5, 6:
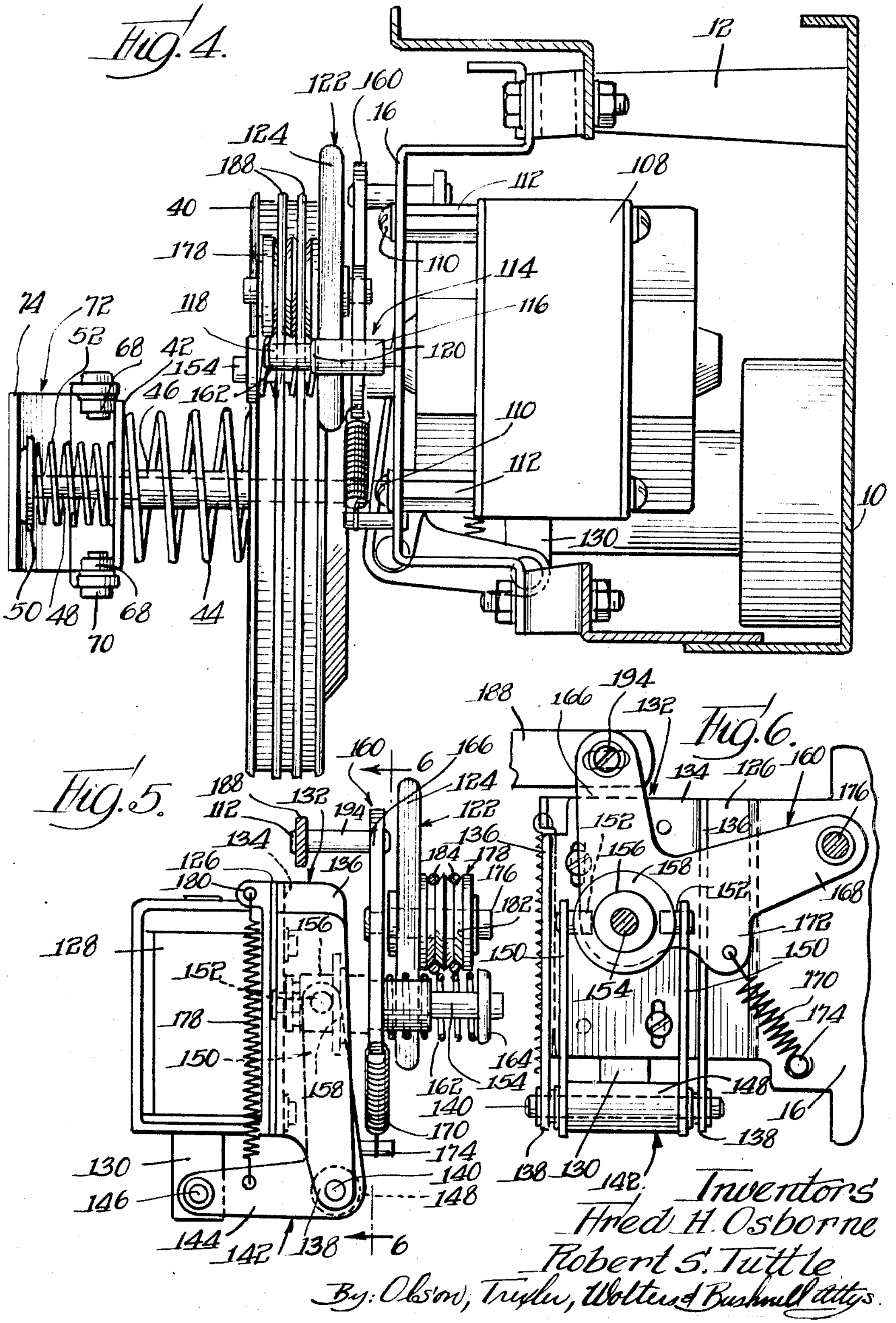
FIG. 4 is a vertical sectional view on substantially the line 4—4 in FIG. 1.
FIG. 5 is a vertical sectional view substantially along the line 5—5 in FIG. 1.
FIG. 6 is a vertical sectional view substantially along the line 6—6 in FIG. 5.

The spring 162 normally biases the sleeve or collar 156 in toward the plate 134, and hence biases the bell crank 142 in a counterclockwise direction as seen in FIG. 5. This is partially opposed by a helper spring 178 stretched between a hole in the horizontal arm 144 of the bell crank 142 and a hole in an ear 180 extending from the rear of the plate 126. This spring 178 is used to aid or augment the solenoid 128 in order that a standard solenoid may be used without the necessity of procuring one of special characteristics. As will be appreciated, with the parts held in by the spring 162, as aforesaid, the bell crank 160 is held in toward the plate 126 so that the rubber tired wheel 122 rides on the larger diameter cylinder 116 of the motor drive shaft spindle 114. When the solenoid is operated, the bell crank 142 is pivoted in a clockwise direction (FIG. 5) and the idler wheel 122 is moved out so that the rubber tire 124 rides on the smaller diameter cylinder 118. The tire readily rides down the shoulder 120. However, upon return, it is not desired for the tire to try to ride up the shoulder 120, as this would quickly wear out the tire. Structure for preventing such wear is provided as hereinafter set forth.

A substantially upright lever arm 182 (FIGS. 1 and 2) is disposed between the pulley 26 and the plate 14 and is pivotally mounted adjacent its bottom end on a post 184 extending horizontally out toward the rear from the plate 14. At its upper end the lever arm 182 is pivotally connected at 186 to a horizontal connecting rod 188 which is formed in two pieces and connected together by means of a screw-in-slot connection 190 to allow longitudinal adjustment. The opposite end of the horizontal connecting rod 188 is pivotally connected at 192 to a stud 194 (FIGS. 3 and 5) extending forwardly from the substantially vertical arm 166 of the bell crank 160.

A pin 196 (FIGS. 1 and 2) extends forwardly from the back of the pulley 26 and bears against the side of the substantially vertical lever arm 182.

Whenever the pulley 26 (and the cam 24) is in its full counterclockwise direction (slightly past the position seen in FIG. 1), the pin 196 pushes against the arm 186. This, in turn pulls on the connecting arm 188 and pivots the bell crank 160 in a counterclockwise direction, whereby to retract the wheel 122 and tire 124 from the drive spindle 114, whereby the wheel may be shifted axially of the drive spindle without a rubbing action.

*Operation*

The starting of a record playing cycle is effective by mechanism not shown nor of particular importance herein. However, such mechanism operates through the wire 28, 30 to turn the pickup arm shaft 22, and hence to move the cam 24. Part of the mechanism not shown also starts the motor 108, but for purposes of the present disclosure it would be satisfactory to consider this motor as continuously operating.

Upon movement of the shaft 22 in a clockwise direction as viewed in FIG. 1, the pin 196 moves from the lever arm 182, and the rubber tire 124 of the wheel 122 is allowed to move into engagement with the spindle 114. As noted heretofore the tire normally engages the larger diameter portion 116, thereby to drive the idler wheel 122 and pulley 180 at a relatively high speed, and hence to turn the pulley 40 and associated parts at 45 r.p.m. When the flange or washer 42 is pushed in or forward to effect clamping of a record, and as the face cam 34 acts on the roller 66 in an effort to press in the center shaft 48 either the shaft goes all of the way in for the playing of a 45 r.p.m. record, or it does not.

If a 33⅓ r.p.m. record is on the turntable the center shaft 48 will not move all of the way forward. Thus, when the cam roller 66 engages the high spot on the cam face 34 the plate 65 will move forward, but the plate 73 will be held back by the end portion 74 thereof bearing against the center shaft 48, whereupon the switch 98 will be closed, thereby to operate the relay 102 which closes and latches in. Upon such closing of the relay 102 the solenoid 128 will be energized, thus to rotate the bell crank 142 in a clockwise direction as seen in FIG. 5. This effects movement of the wheel 122 outwardly or rearwardly whereby to move the rubber tire 124 from the larger spindle diameter portion 116 to the smaller diameter portion 118. The tire readily moves down the shoulder 120 from the larger diameter portion to the smaller diameter portion without damage to the tire. The idler wheel and pulley thus move at a slower speed and the turntable 40 and the pulley 40 and associated parts (including the unseen turntable) turn at 33⅓ r.p.m.

At the conclusion of playing of a 33⅓ r.p.m. record the pickup arm shaft 22 turns in a counterclockwise direction back to its original position. The pin 196 engages the arm 182, thereby to retract the rubber tire 124 of the wheel 122 from the motor shaft spindle 114 through pivoting of the bell crank 160. Substantially immediately upon such retraction the upper edge of the cam 24 engages the blade 106 to release the relay 106, whereupon the solenoid 128 is deenergized and the spring 162 returns the wheel 122 to its innermost or forward position where it will engage the larger diameter portion of the spindle at the start of a new record playing cycle.

Obviously, if the record being played is a 45 r.p.m. record, the tire remains on the large diameter portion at all times. It will be understood that the parts are normally in such position as to produce playing at 45 r.p.m., and a change is effected only when a 33⅓ r.p.m. record is encountered on the turntable.

A preferred example of the invention has now been shown and described. Various changes in structure will no doubt occur to those skilled in the art, and will be understood as forming a part of the present invention insofar as they fall within the spirit and scope of the appended claims.

The invention is claimed as follows:

1. A two-speed phonograph drive comprising a shaft for rotating a turntable, a pulley on said shaft, an idler pulley, belt drive means for driving said shaft pulley from said idler pulley, an idler wheel fixed to said idler pulley and rotatable on a common axis therewith, said idler wheel having a resilient circumference, power shaft means adjacent said idler wheel for driving engagement therewith and having a spindle with two different diameters, said spindle having an axis parallel to said common axis, means for shifting said idler pulley and wheel axially of said spindle axis to cause said resilient circumference of said wheel to bear selectively against one of the two different diameters of said spindle for driving said idler wheel and pulley at either of two selected speeds, and means for moving the axis of said idler wheel and pulley away from said spindle to permit free axial shifting thereof from the smaller diameter portion of the spindle to the larger diameter portion thereof, said drive belt means comprising a plurality of separate parallel acting O-rings each of small circular cross section, said idler pulley having a like plurality of grooves individually receiving and positioning said O-rings, and said shaft pulley having a single broad bearing surface receiving all of said O-rings.

2. A two-speed phonograph drive comprising a shaft for rotating a turntable, record center-hole size sensing means axially movable relative to said shaft in accordance with the size of center hole of a record on said turntable, a switch operated by such axial movement of said sensing means, an idler unit, drive means interconnecting said idler unit and said turntable shaft for driving said turtable shaft from said idler unit, said idler unit including a wheel having a resilient circumference, drive shaft means positioned adjacent said wheel for driving engagement with said circumference and having a spindle with two different diameters, electromagnetic means for shifting said idler unit axially of said spindle to cause said resilient circumference of said wheel to bear selectively against the two different diameters of said spindle for driving said idler unit, a relay operable by said switch, said relay being interconnected with said electromagnetic means to operate said electromagnetic means, said relay having means for latching it in operated position, and means for unlatching said relay at the end of a playing cycle of a record.

3. A two-speed phonograph drive as set forth in claim 2 and further including a tone arm shaft, and wherein the means for unlatching said relay is interconnected with said tone arm shaft for operation thereby.

4. A two-speed phonograph drive comprising a shaft for rotating a turntable, an idler unit rotatable about an axis, means drivingly interconnecting said turntable shaft and said idler unit for driving said turntable shaft from said idler unit, means including a sub-base rotatably mounting said idler unit, said sub-base being shiftable axially of said idler unit, resilient means normally urging said sub-base axially of said idler unit to a limit position, electromagnetic means interconnected with said sub-base for shifting said sub-base axially of said idler unit away from said limit position, said idler unit including a wheel having a resilient circumference, drive shaft means positioned adjacent said wheel for driving engagement with said circumference and having a spindle with two different diameters, said resilient circumference engaging one diameter of said spindle with said sub-base in the limit position to which it is urged by said resilient means and said resilient circumference engaging the other of said spindle diameters upon operation of said electromagnetic means, and means for moving the axis of said idler unit away from said spindle to permit movement of said sub-base in at least one direction free of rubbing action of said resilient circumference against said spindle.

5. A two-speed phonograph drive as set forth in claim 4 wherein the electromagnetic means comprises a solenoid.

6. A two-speed phonograph drive as set forth in claim 5 wherein the sub-base comprises a bell crank having two arms and pivotable substantially at the intersection of said two arms, and said idler unit being rotatably mounted on one of said two arms, and said shifting means being interconnected with the other of said two arms to effect pivoting of said bell crank.

7. A two-speed phonograph drive comprising a shaft for rotating a turntable, an idler unit, means drivingly interconnecting said idler unit and said turntable shaft for driving said turntable shaft from said idler unit, a bell crank, said bell crank having a pair of arms intersecting at an apex, a stud extending from one arm of said bell crank substantially normal thereto, said idler unit being rotatably mounted on said stud, means pivotally mounting said bell crank substantially at said apex, said bell crank being shiftable on its mounting means substantially axially of said stud, spring means acting on said bell crank and urging said bell crank to a limit position axially of said stud, electromagnetic operating means operatively connected to said bell crank for moving said bell crank away from said limit position against the action of said spring means, said idler unit including a resilient circumference, a drive shaft means having a spindle thereon with a plurality of different diameters positioned adjacent said idler unit for driving engagement with said resilient circumference, said resilient means engaging one of said diameters with said bell crank in said limit position and engaging another of said plurality of diameters with said electromagnetic operating means having moved said bell crank away from said limit position, and retracting means operatively connected to the other arm of said bell crank to pivot said bell crank about its mounting means and thereby to remove said idler unit resilient circumference from engagement with said spindle to permit free axial shifting thereof in at least one direction.

8. A two-speed phonograph drive as set forth in claim 7 and further including a tone arm shaft and means for pivoting said tone arm shaft, and wherein the retracting means for pivoting said bell crank includes means operatively interconnected with said tone arm shaft and operated by pivoting of said tone arm shaft.

9. A two-speed phonograph drive as set forth in claim 8 wherein the turntable shaft has at least two parts which are axially moveable relative to one another in accordance with the size of the center hole of a record on said turntable, and further including switch means operable by said relatively moveable two shaft parts, a relay operable by said switch, said relay having means for latching it in operated position upon operation thereof, said relay being electrically interconnected with said electromagnetic operating means for operating the same, and means operatively interconnected with said tone arm shaft for unlatching said relay at the end of a record playing cycle.

References Cited

UNITED STATES PATENTS

| | | | |
|---|---|---|---|
| 2,509,054 | 5/1950 | Davis | 274—9.1 XR |
| 2,654,457 | 10/1953 | Ammlung et al. | 274—9 XR |
| 2,838,959 | 6/1958 | Schuyler | 242—55.12 XR |
| 2,891,409 | 6/1959 | Hansen | 274—9.1 XR |
| 2,941,809 | 6/1960 | Schneider | 274—9.1 |
| 3,162,447 | 12/1964 | Hartman | 274—9.1 |
| 3,193,296 | 7/1965 | Rockola | 274—10 |
| 3,220,735 | 11/1965 | Beugin | 274—9.1 |

LEONARD FORMAN, *Primary Examiner.*

J. M. FREED, *Assistant Examiner.*